A. HERR.
MEANS FOR DISTRIBUTING HAY IN BARNS.
APPLICATION FILED JULY 5, 1911.
1,096,240.
Patented May 12, 1914.
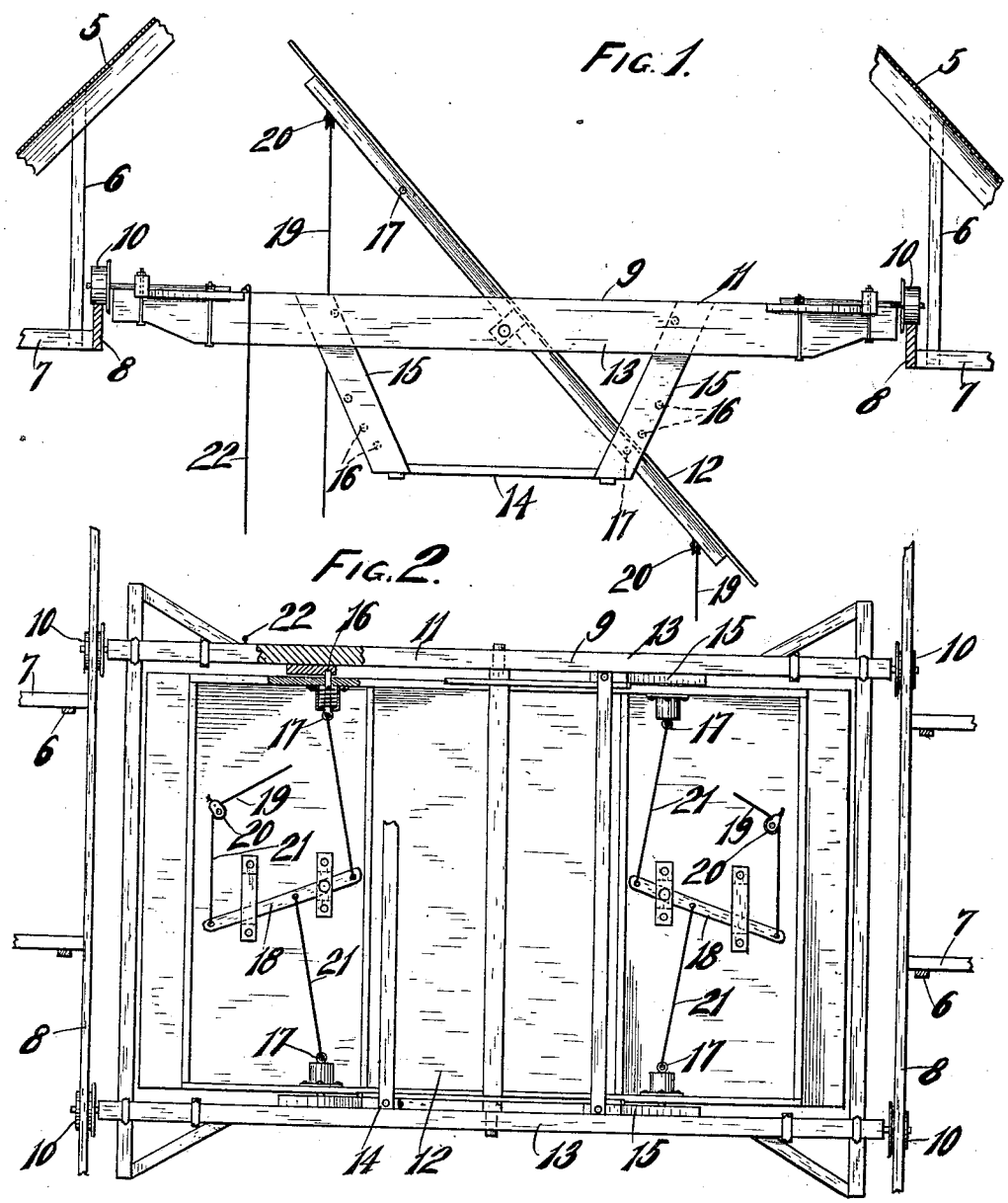
WITNESSES
INVENTOR.
Adam Herr,
By Morsell & Caldwell
ATTORNEYS.
COLUMBIA PLANOGRAPH CO., WASHINGTON, D. C.

UNITED STATES PATENT OFFICE.

ADAM HERR, OF SHEBOYGAN FALLS, WISCONSIN.

MEANS FOR DISTRIBUTING HAY IN BARNS.

1,096,240.  Specification of Letters Patent.  Patented May 12, 1914.

Application filed July 5, 1911. Serial No. 636,827.

*To all whom it may concern:*

Be it known that I, ADAM HERR, a citizen of the United States, and resident of Sheboygan Falls, in the county of Sheboygan and State of Wisconsin, have invented new and useful Improvements in Means for Distributing Hay in Barns, of which the following is a description, reference being had to the accompanying drawings, which are a part of this specification.

The invention relates to improvements in hay distributers and is more particularly adapted for use in distributing hay, straw and the like in barns.

It is one of the objects of this invention to provide a hay distributer which is designed to facilitate the storing of hay within and to the opposite sides of a barn when it is dropped from the carrier thereby obviating the necessity of manually distributing the hay.

A further object of the invention is to provide a hay distributer which may be easily moved from one end of the barn to the other and which may also be tilted in opposite directions to distribute the hay to opposite sides of the barn.

A further object of the invention is to provide a hay distributer in which the tiltable platform may be locked in adjusted position or unlocked by means of ropes depending from said platform.

With the above, and other objects in view, the invention consists of the improved hay distributer and its parts and combinations as set forth in the claims and all equivalents thereof.

In the accompanying drawing in which the same reference characters indicate the same parts in all of the views Figure 1 is a transverse sectional view of a portion of a barn provided with the improved hay distributer, the platform being shown in tilted position; and Fig. 2 is an inverted plan view of the distributer and a portion of the track or supporting timbers.

Referring to the drawing the numeral 5 indicates a portion of the roof of a barn having depending timbers 6 and cross joist 7 to which the track or support 8 is connected. A rectangular frame 9 provided with flanged rollers 10 which rest on the track comprises the carriage 11 which is adapted to travel back and forth on the track and longitudinally with relation to the peak of the roof.

A tiltable platform 12 positioned within the rectangular frame 9 and medially pivotally connected to the side timbers 13 of the frame is adapted to be tilted to one side or the other to deflect the hay dropped thereon from a carrier (not shown) to one side or the other of the barn.

The side timbers 13 have depending therefrom a lock frame 14 the angularly positioned parts 15 thereof being provided with bolt openings 16 to accommodate the spring actuated bolts 17 carried by the tiltable frame 12. A plurality of these bolt openings are provided on the angularly positioned parts of the lock frame and they are arranged in a line concentric to the axis of movement of the platform, in order to lock the platform in adjusted position.

To provide for operating the bolts from the lower portion of the barn are levers 18 pivotally connected to the lower surface of the platform having operating ropes 19 connected to their outer ends which pass through pulleys 20 and depend therefrom to the floor of the barn. The inner end portions of the levers on opposite sides of their respective pivotal connections with the platform are connected to the inner ends of the spring actuated bolts by means of ropes 21 so that when the operating rope 19 connected to the bolts which hold the platform in adjusted position is pulled downwardly the bolts will be drawn out of the bolt openings and the platform may then be swung to another position and again locked.

The platform may be tilted to the position desired by pulling on one or the other operating rope and the carriage may be pulled along the track by the same ropes or a traversing rope 22 may be provided for that purpose.

From the foregoing description it will be seen that the hay distributer is very simple in construction and operation and is well adapted to deflect material dropped on the platform thereof to one side or the other of the barn and by moving the carriage back and forth the entire barn may be easily filled.

What I claim as my invention is:

1. A hay distributer, comprising a track, a rectangular frame movably mounted on the track, a tiltable platform positioned within and in substantially the same horizontal plane as the frame and pivotally connected to the side portions thereof, a locking frame depending from the side portions of the frame and provided with a bolt engaging means, and bolts carried by the platform for engaging said means.

2. A hay distributer, comprising a track, a rectangular frame provided with rollers which ride on the track, a tiltable platform positioned within and in substantially the same horizontal plane as the frame and pivotally connected to the side portions thereof, a locking frame depending from the side portions and provided with bolt openings, and bolts carried by the platform which are adapted to enter some of the openings to lock the platform in adjusted position.

3. A hay distributer, comprising a track, a rectangular frame provided with rollers which ride on the track, a tiltable platform positioned within the frame and pivotally connected to the side portions thereof, a locking frame depending from the side portions and provided with bolt openings, spring actuated bolts carried by the platform which are adapted to enter some of the openings to lock the platform in adjusted position, levers pivotally connected to the platform and connected to the bolts, and ropes connected to the levers for operating the bolts and for tilting the platform.

In testimony whereof, I affix my signature, in presence of two witnesses.

ADAM HERR.

Witnesses:
HERMANN HAMMER,
WILLIAM BAKURAS.

---

Copies of this patent may be obtained for five cents each, by addressing the "Commissioner of Patents, Washington, D. C."